Figure 1:
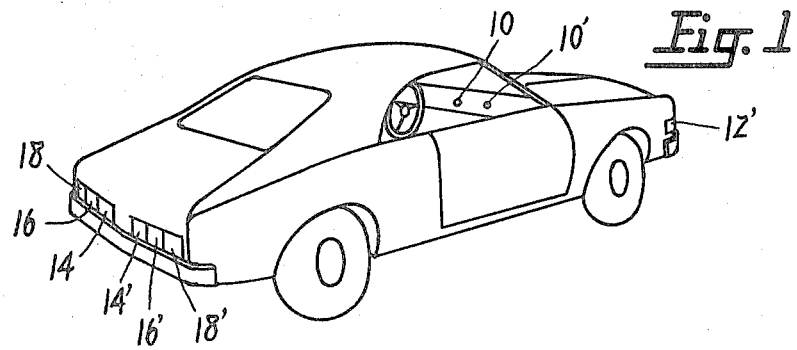

United States Patent

[11] 3,618,010

[72] Inventor Nagatoshi Suzuki
      356 Kugahara Otaku, Tokyo, Japan
[21] Appl. No. 749,814
[22] Filed Aug. 2, 1968
[45] Patented Nov. 2, 1971

[54] SEQUENTIAL TURN DIRECTION SIGNALLING SYSTEM FOR AUTOMOTIVE VEHICLES
      1 Claim, 5 Drawing Figs.
[52] U.S. Cl............................................. 340/67,
                                                   340/82
[51] Int. Cl............................................ B60q 1/38
[50] Field of Search.............................. 340/82

[56] References Cited
UNITED STATES PATENTS
2,873,437  2/1959  Greiner et al................ 340/81 X
3,315,227  4/1967  Du Rocher................... 340/82

Primary Examiner—John W. Caldwell
Assistant Examiner—Kenneth N. Leimer
Attorney—Joseph J. Juhass ABSTRACT: According to the invented sequential direction signalling system, a plurality of turn direction signalling lamps are horizontally mounted on each side of the vehicle at one end thereof and in each plurality, the first lamp to be illuminated on each occasion ;is always the same, viz., the extremely right lamp for left turn or the extremely left lamp for right turn.

PATENTED NOV 2 1971  3,618,010

3,618,010

SEQUENTIAL TURN DIRECTION SIGNALLING SYSTEM FOR AUTOMOTIVE VEHICLES

BACKGROUND OF THE INVENTION

This invention relates to a sequential turn direction signalling system for automotive vehicles.

Generally, in such a system, turn direction signalling lamps are mounted on each side of the vehicle at each end thereof and the proposed turn direction is indicated by sequentially illuminating the lamps from right to left (for left turn) or from left to right (for right turn) as if light flows in the proposed turn direction. The system is provided with a small electric motor for rotating cams for controlling switches for the signal lamps. At the end of the turn, the electric motor stops automatically. However, since said electric motor never stops at a definite position, the starting lamp to be illuminated at the next operation is not definite so that confusion may occur. Further, switch contacts for the signal lamps often remain half opened whereby at the start of the next operation, excessive electric current will flow through the gap between said contacts which tends to damage the contacts.

This invention has for its object to eliminate such defects by means of simple but effective devices.

For an understanding of the invention, reference is made to the following description of a typical embodiment thereof as illustrated in the accompanying drawings.

Figure 2:
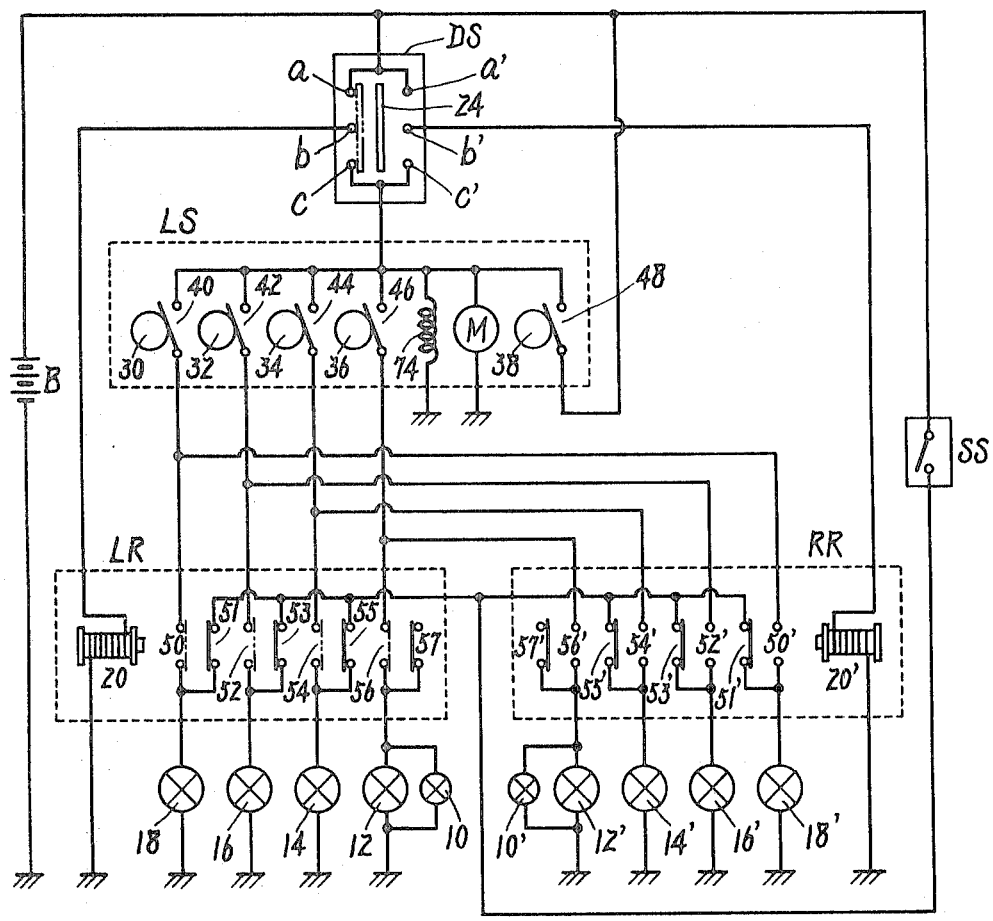
Figure 3:
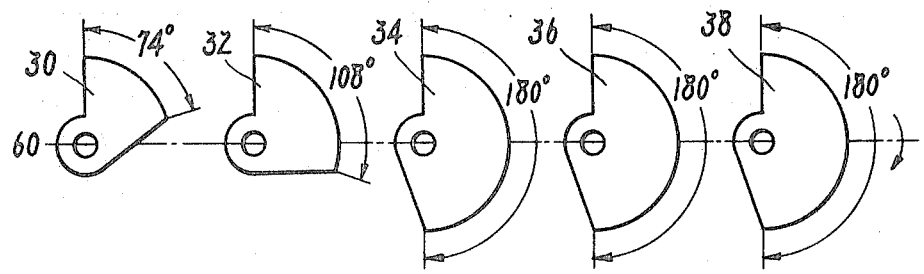
Figure 4:
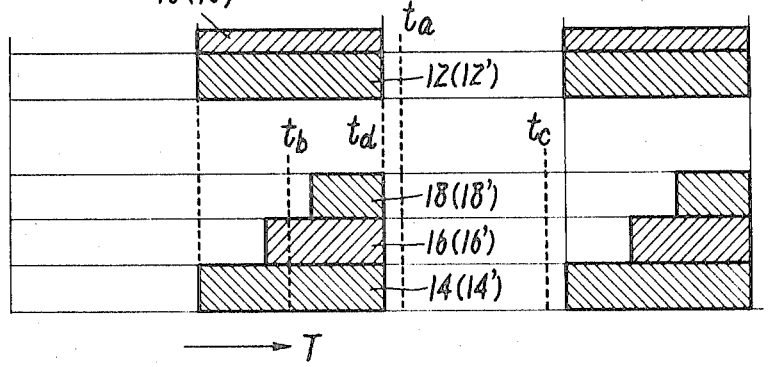
Figure 5:
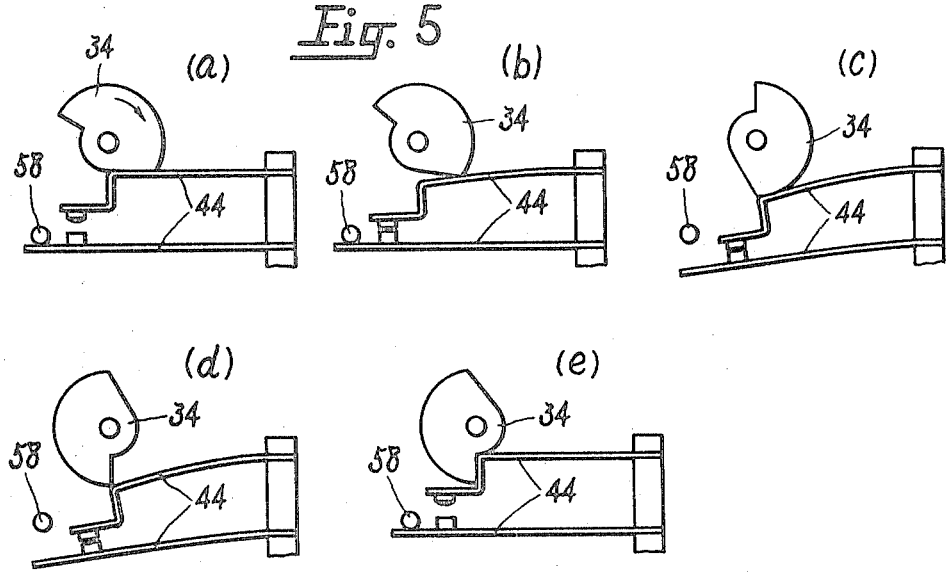

In the drawings:

FIG. 1 shows an automotive vehicle provided with the turn direction signalling system according to this invention, FIG. 2 is a schematic wiring diagram of said system, FIG. 3 shows cams for controlling switches for signal lamps, FIG. 4 shows the relations of the current "ON" times of the signal lamps, and FIGS. 5 (a) to e) show, step by step, the actions of one of the cams and cooperating elastic switch blades.

DESCRIPTION OF THE INVENTION

In the wiring diagram shown in FIG. 2, (B) is a usual grounded vehicle battery which is connected with the upper contacts (a) and (a') of a selective direction switch (DS) which is usually mounted on the steering column. Said direction switch consists of three left side contacts (a) (b) (c), three right side contacts (a') (b') (c') and a movable contact (24) between them. The contacts (a) and (a') as well as (c) and (c') are connected together. The middle contact (b) of the direction switch (DS) is connected to a grounded solenoid (20) of the left side relay (LR) while the other middle contact (b') is connected to a grounded solenoid (20') of the right side relay (RR). The lower contacts (c) and (c') of the direction switch (DS) are connected with the lamp switch set (LS) which consists of switches (40) (42) (44) (46) (48), a coil (74), a small electric motor (M) and cams (30) (32) (34) (36) (38). Said cams are all affixed to the shaft of the electric motor (M) and operate the corresponding switches (40) (42) (44) (46) (48) respectively while said cams are rotating.

As the left side relay (LR) and the right side relay (RR) are of similar constructions, only the left side relay (LR) will be explained here.

The left side relay (LR) consists of a solenoid (20), usually open contacts (50) (52) (54) (56) and the other contacts (51) (53) (55) (57) which are usually closed by movable contacts under the action of spring means. Each pair of said contacts (50) (51), (52) (53), (54) (55) and (56) (57) is connected in parallel, to the corresponding signal lamp. A group of the direction signalling lamps (14) (16) (18) is mounted horizontally at the rear left side of the vehicle.

The cams (30) (32) (34) (36) (38) are shown in FIG. 3 in detail. These cams are affixed to the shaft (60) of the electric motor (M) and operate the corresponding switches (40) (42) (44) (46) (48) respectively. Of these cams, the cam (30) has an arcuate surface extending over about 74°. The cam (32) has an arcuate surface extending over about 108°. The other three cams (34) (36) (38) have respectively arcuate surfaces extending over 180°.

As the actions of the cams (30) (32) (34) (36) (38) against the corresponding switches are similar, only one of them (34), is illustrated step by step in FIGS. 5 (a) (b) (c) (d) and (e) wherein the switch consists of two elastic blades, the upper one being in contact with the cam while the lower one is prevented from ascending by means of a stop (58). As is clear from the above, very positive electrical contact is assured between the switch contacts.

The function of the invented turn direction signalling system will be explained on the "left turn" of the vehicle as an example.

First, the direction switch (DS) is manually operated so as to move the contact (24) toward the left side contacts (a) (b) (c) as shown in dotted line in FIG. 2. Then, the solenoid (20) of the left side relay (LR) will be energized which attracts all the movable contacts towards the left so as to close the contacts (50) (52) (54) (56) as shown in dotted lines in FIG., 2. Simultaneously, the electric motor (M) starts to rotate together with the cams (30) (32) (34) (36) (38) whereby the switches (40) (42) (44) (46) (48) are operated separately.

Since the cam (34) has an active arcuate surface extending over 180° the signal lamp (14) will be kept illuminated during one half of the rotation of the shaft (60). Due to the forms of the cams, the second signal lamp (16) will be illuminated later than the first lamp (14) and the last lamp (18) will be illuminated later than the second lamp (16). During the next one half of the rotation of the shaft (60), all the signal lamps remain unlit as shown in FIG. 4. These actions are repeated as long as the electric motor (M) rotates. In this manner, light appears as if it flows from right to left whereby the proposed turn direction of the vehicle will be very clearly observed by the following vehicles.

The front lamp (12) and pilot lamp (10) are kept illuminated during one half of the rotation of the electric motor (M) and kept unlit during the other half of the rotation.

As soon as the left turn of the vehicle be completed, the movable contact (24) of the direction switch (DS) will automatically return to the neutral position whereby the solenoid (20) will be deenergized and the lamp circuits will be opened at once.

If "off" of the direction switch (DS) occurs at (tb) (see FIG. 4), all the signal lamps will extinguish at once, but since the switch (48) is closed by the cam (38) and connected with the battery (B), the motor (M) continues to rotate. And, as soon as the switch (48) becomes "off," the motor (M) will stop whereby all the switches (44) (46) (48) open. If the direction switch (DS) becomes "off" at (tc), the electric motor (M) ought to stop since no voltage is impressed on it, but in fact, often the motor continues to rotate due to the inertia and may close the switch (48). Then, until the switch (48) becomes "off" the motor (M) will continue to rotate. If the direction switch (DS) becomes "off" at (td), the motor (M) will continue to rotate by inertia so as to close the contact (48) again. In order to prevent the above mentioned defects, a small coil (74) is inserted in parallel with the electric motor (M). Counter E.M.F. generated in said coil (74) at the moment of "off" of the direction switch (DS) may bring the electric motor (M) to a quick stop. In practice, for an electric motor (DC 12 v., 2-poles, series winding, load current—17 mA, r.p.m. 3,500 c./m.), a coil (d=2.6 m./m., l=21 m./m., 2,700 winding of 0.08 m./m. Cu. wire, iron core) is found effective to stop the electric motor at once.

As is clear from the above, according to this invention, whenever the direction switch (DS) returns to the neutral position, the positions of the cams (30) (32) (34) (36) (38) relative to their cooperating switches (40) (42) (44) (46) (48) remain always the same whereby the starting direction signalling lamp to be illuminated on every direction signalling operation is the same. For instance, at the left turn, the first to be illuminated is always the lamp (14) whereas the first to be illuminated at the right turn is always the lamp (14') whereby confusion may be effectively prevented.

To give warning of an emergency stopping or parking of the vehicle, the stop switch (SS) is manually closed. If the stop switch (SS) be closed when the direction switch (DS) is "off," all the left and the right signal lamps (14) (16) (18) and (14') (16') (18') will be illuminated simultaneously without blinking. If the stop switch (SS) be closed when the direction switch (DS) is "on," the movable contact (24) being in contact, for example, with the left side contacts (a) (b) (c), the left side lamps (14) (16) (18) will be sequentially illuminated as usual while all the right side lamps (14') (16') (18') will be kept illuminated. In both cases, the following vehicles can clearly observe the emergency signal.

While a specific embodiment of the invention has been described in detail to illustrate the application of the invention principles, it will be understood that the invention may be embodied otherwise without departing from such principles.

What is claimed is:

1. A sequential turn direction signalling system comprising, a battery, a selective direction switch provided with upper, middle and lower stationary contacts and a hand operated movable contact, the upper contacts being connected with the battery, a plurality of direction signalling lamps mounted horizontally on each side of a vehicle at the rear thereof and direction signalling lamps mounted on each side of the vehicle, at the front thereof, a left side solenoid connected with one of the middle contacts of the selective direction switch acting to close normally open contacts in the circuits of all of the left side direction signalling lamps, a right side solenoid connected with the other middle contact of the selective direction switch acting to close normally open contacts in the circuits of all the right side direction signalling lamps, a lamp switch set connected with the lower contacts of the selective direction switch comprising a motor, a coil in parallel with said motor for bringing said motor to a quick stop against inertia, cams and cam operated switches connected to the corresponding normally open contacts for determining the sequence and illumination of the direction signalling lamps, and a cam and cam switch in a holding circuit for the motor for insuring completion of a cycle of operation of the motor shaft, all of said cams being mounted on the motor shaft, and a stop switch interposed between the battery and normally closed contacts operated by said solenoids, said normally closed contacts being in circuits to the corresponding rear direction signalling lamps.

* * * * *